Figure 1:
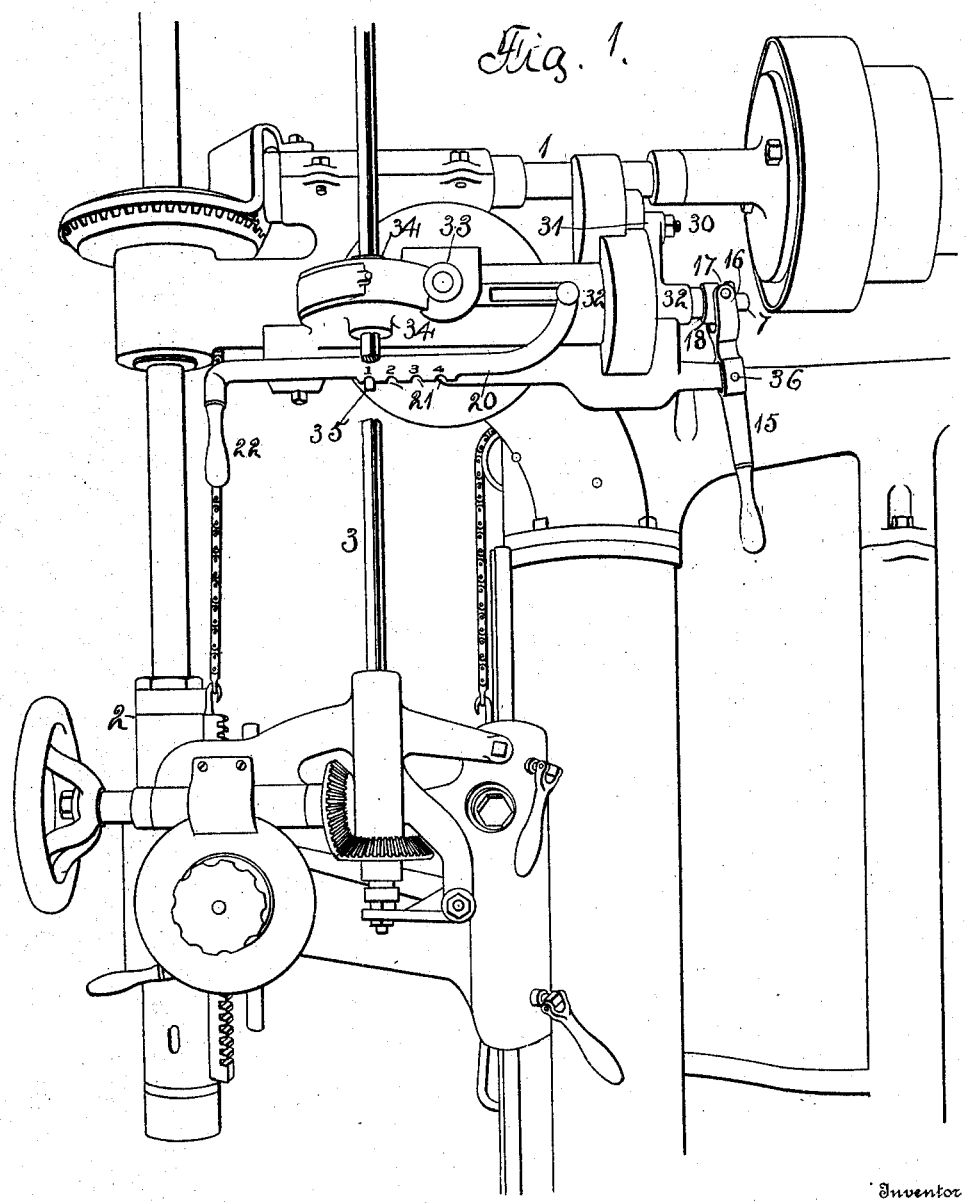

No. 823,201. PATENTED JUNE 12, 1906.
J. P. BARNES.
GEARING.
APPLICATION FILED MAR. 8, 1904.

2 SHEETS—SHEET 1.

Witnesses
W. E. Griggs
E. Behel

Inventor
Joseph P. Barnes.
By A. O. Behel
Attorney

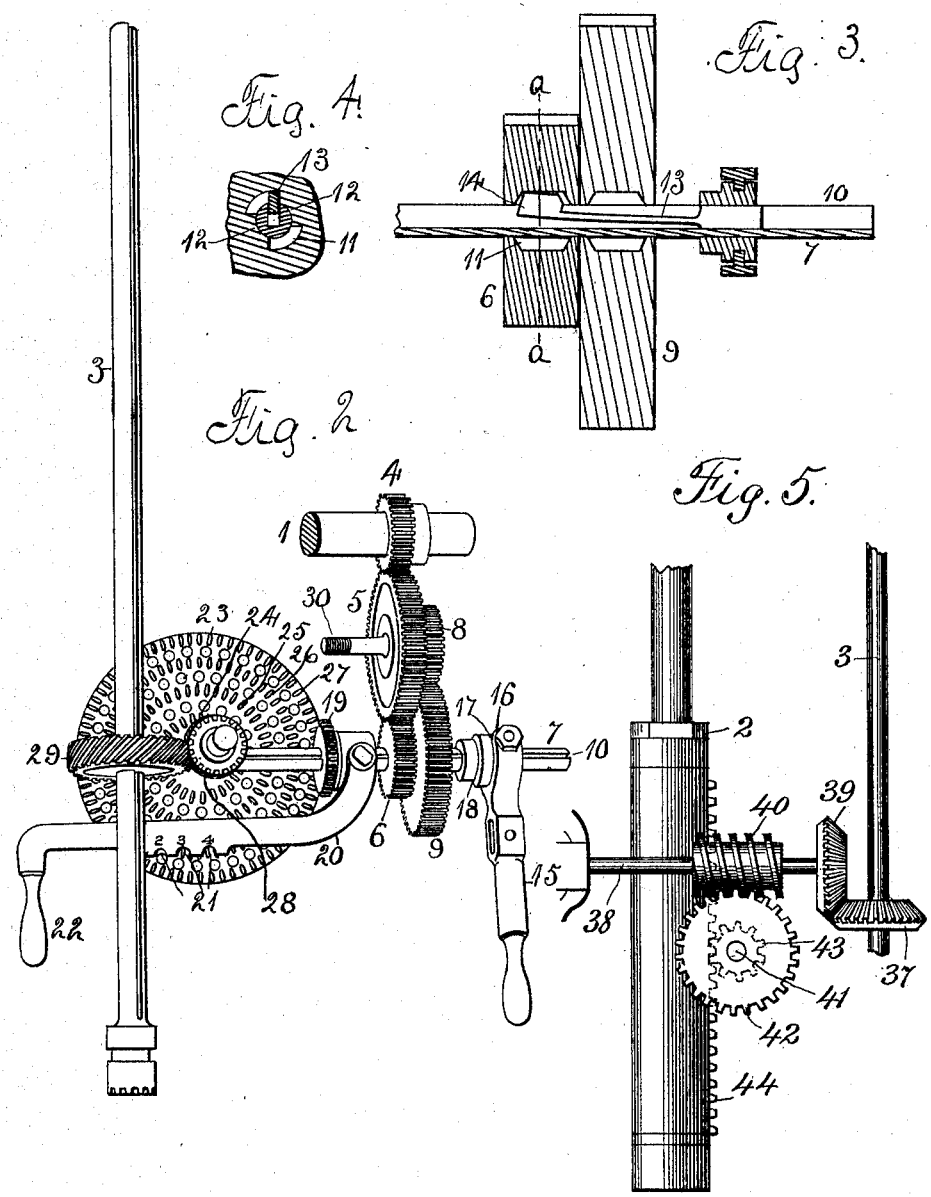

UNITED STATES PATENT OFFICE.

JOSEPH P. BARNES, OF ROCKFORD, ILLINOIS, ASSIGNOR TO W. F. & JOHN BARNES COMPANY, OF ROCKFORD, ILLINOIS, A CORPORATION OF ILLINOIS.

GEARING.

No. 823,201.  Specification of Letters Patent.  Patented June 12, 1906.

Application filed March 8, 1904. Serial No. 197,125.

*To all whom it may concern:*

Be it known that I, JOSEPH P. BARNES, a citizen of the United States, residing at Rockford, in the county of Winnebago and State of Illinois, have invented certain new and useful Improvements in Gearing, of which the following is a specification.

The object of this invention is to impart to the drill-spindle a greater range of speeds than heretofore given it and with the employment of a simple mechanism.

In the accompanying drawings, Figure 1 is a perspective view of a drilling-machine containing my improvements. Fig. 2 is a perspective view of my improvements detached from the frame of the machine. Fig. 3 is a section of the speed-changing clutch connection. Fig. 4 is a section on dotted line *a*, Fig. 3. Fig. 5 is a skeleton representation of the gear-and-worm connection between the vertical shaft 3 and the drill-spindle.

The main frame of the machine is of an old construction and supports a driving-shaft 1, having a gear connection with the drill-spindle 2. A vertical shaft 3 is supported in suitable bearings. The lower end of this shaft 3 supports a miter-toothed wheel 37. A shaft 38 is supported by the main frame and has a miter-toothed wheel 39 secured to it and meshes with the miter-toothed wheel 37. A worm 40 is secured to the shaft 38. A cross-shaft 41 is supported by the main frame. To the shaft 41 is secured a worm-wheel 42, also a spur-pinion 43. The spur-pinion 43 engages a toothed rack 44, connected to the drill-spindle.

The driving-shaft 1 supports a toothed pinion 4, which meshes with a larger toothed wheel 5, and this in turn meshes with a smaller toothed pinion 6, loosely mounted on the shaft 7. To the toothed wheel 5 is connected a toothed pinion 8, which meshes with a larger toothed wheel 9, loosely mounted on the shaft. 7 This shaft 7 is provided with a lengthwise-grooved way 10. The toothed pinion 6 has a center chamber 11 in its bore and has a bar 12 across the chamber. The toothed wheel 9 has a similar chamber and bar. A key 13 is fitted to slide in the grooved way 10 and has an enlarged end 14. A lever 15 has a connection with the key by its forked end 16, having projections entering a circumferential groove 17 in the collar 18, connected to the key. By means of this key a connection can be made between either gear-wheel 6 or 9 and the shaft 7, without stopping the rotation of the gear-wheels.

Upon the shaft 7 is located a toothed wheel 19 and has a feather connection therewith, so that it may be moved in the lengthwise direction of the shaft and be rotated by it. An arm 20 has a connection with the toothed wheel in a manner to permit the wheel to rotate and be moved bodily along the shaft. This arm has a series of notches 21 in its under face and a handle 22 depending from its free end. A disk 23 has its face formed with a series of concentric rows of teeth 24, 25, 26, and 27 and also has a worm 28 connected with it. To the vertical shaft 3 is connected a worm-wheel 29, which meshes with the worm 28. The toothed wheel 19 is located with respect to the disk 23, that it may be moved into engagement with the teeth of the concentric rings. The combined gear-wheels 5 and 8 are supported by the shaft 30, located in bearings 31 in the main frame. The shaft 7 is supported by bearing 32 in the main frame. The disk 23 and worm 28 are supported in bearing 33 in the main frame and the worm-wheel supported by bearings 34. From the casing extends a stud 35, which receives the notches 21 of the arm 20. The lever 15 has a pivotal connection with the main frame at the point 36. It will be seen that all the operative parts are supported and inclosed by the main frame.

In operation, by means of the clutch connection between the shaft 7 and toothed wheels 5 and 9 two different speeds can be given to the shaft 7 from the driving-shaft 1. By means of the toothed wheel 19 and its adjustable engagement with the teeth of the disk 23 four different speeds can be had, which will make eight different speeds imparted to the vertical shaft 3 and by it to the drill-spindle.

I claim as my invention—

1. In a drilling-machine, the combination of a vertically-arranged spindle, a toothed rack supported by the spindle, a cross-shaft, a pinion supported by the cross-shaft a main driving-shaft, means connected therewith for rotating the spindle, a secondary shaft, a disk having its face formed with a series of concentric rings of teeth, a toothed wheel supported by the secondary shaft, means for moving the toothed wheel into engagement with the teeth of the different rings, means for rotating the secondary shaft from the main shaft, a worm supported by the disk, a worm-wheel meshing with the worm, and a connection between the worm-wheel and cross-shaft.

2. In a drilling-machine, the combination of a vertically-arranged spindle, a toothed rack supported by the spindle, a cross-shaft, a pinion supported by the cross-shaft, a main driving-shaft, means connected therewith for rotating the spindle, a secondary shaft, a disk having its face formed with a series of concentric rings of teeth, a toothed wheel supported by the secondary shaft, means for moving the toothed wheel into engagement with the teeth of the different rings, two toothed wheels loosely mounted on the secondary shaft, a gear connection between the gears and the main driving-shaft, clutch mechanism for forming a connection between the secondary shaft and either of the toothed wheels mounted thereon, a worm supported by the disk, a worm-wheel meshing with the worm, and a connection between the worm-wheel and cross-shaft.

JOSEPH P. BARNES.

Witnesses:
T. E. HUMISTON,
A. O. BEHEL.